United States Patent [19]

LeDuc

[11] Patent Number: 5,149,473
[45] Date of Patent: Sep. 22, 1992

[54] METHOD FOR PRODUCTION OF STYRENIC FOAM

[75] Inventor: Edward C. LeDuc, Marietta, Ga.

[73] Assignee: Amoco Corporation, Chicago, Ill.

[21] Appl. No.: 832,023

[22] Filed: Feb. 6, 1992

[51] Int. Cl.$^5$ .............................. C08J 9/08; C08J 9/14
[52] U.S. Cl. ........................................ 264/51; 264/53; 521/79; 521/97; 521/98; 521/910
[58] Field of Search .................. 264/51, 53; 521/79, 521/97, 98, 910

[56] References Cited

U.S. PATENT DOCUMENTS

| | | | |
|---|---|---|---|
| 3,725,317 | 4/1973 | Roden | 521/79 |
| 4,795,763 | 1/1989 | Gluck et al. | 521/99 |
| 4,956,395 | 9/1990 | Leduc | 521/98 |
| 5,064,869 | 11/1991 | Bopp et al. | 521/56 |

*Primary Examiner*—Morton Foelak
*Attorney, Agent, or Firm*—William E. Murray; William H. Magidson; Frank J. Sroka

[57] ABSTRACT

The invention comprises a method for the production of insulating styrenic foams comprising use of a blowing agent comprising a $C_4$-$C_5$ alkane, $CO_2$ and a halogenated ethane selected from the group consisting of 1,1,1-trifuluoroethane, 1-chloro-1,1-difluoroethane and 1,1,1,2-tetrafluoroethane and mixtures thereof, wherein the halogenated ethane amount is less than 70.0 wt. % of the total blowing agent weight. The invention further comprises the styrenic foams made using the blowing agent composition and a paraffin wax. The method of the invention advantageously eliminates ethylchloride from styrenic foam production methods while limiting use of the halogenated ethane to minimum amounts suitable to produce foams with good insulative properties.

9 Claims, No Drawings

METHOD FOR PRODUCTION OF STYRENIC FOAM

FIELD OF THE INVENTION

This invention relates generally to a method for the production of an insulating styrenic foam, and more particularly to such a method which does not use ethylchloride as a blowing agent.

BACKGROUND OF THE INVENTION

Thermoplastic foams made from styrenic polymers, such as polystyrene, have found extensive use, particularly as insulating materials. Genrally, insulating styrenic foams are produced in thicknesses greater than about one-half inch. The insulating value of such foams is measured in terms of heat conduction resistance or R-value, per one inch of foam thickness, and adequate insulating foams typically have R-values of about 5.0 per inch or greater. Styrenic insulating foams to meet government construction standards generally must also be dimensionally stable, i.e., they must have a maximum change in any of length, width or thickness of less than about 2.0 percent when subjected to a 158° F. temperature for 24 hours.

These styrenic foams typically are made by mixing a volatile blowing agent with the styrenic resin under a controlled temperature and pressure sufficient to liquefy and plasticize the resin and to maintain the resin in an unfoamed state, and then extruding the resin-blowing agent mixture through a die into a zone of lower temperature and pressure which results in the formation of the styrenic foam. Blowing agent compositions for styrenic foam production generally are required first to have a system vapor pressure at the melt temperature of the styrenic resin sufficient to produce acceptable insulating foam, and second to provide sufficient plasticization to the styrenic resin to permit extrusion at suitable production rates. The blowing agent should also not have too great of a plasticizing effect on the styrenic resin, to avoid dimensional instability of the foam.

Dimensionally stable, insulating styrenic foams which retain an R-value above 5.0 per inch upon aging, are being produced commercially with blowing agents based on 1-chloro-1,1-difluoroethane (also known as "FC-142b", which will be used for convenience hereafter). FC-142b-based blowing agents eliminate the use of the chlorofluorocarbons, such as Freon 12, which are suspected of reacting with ozone after their release into the earth's atmosphere.

These hydrofluorocarbon blowing agents of reduced or zero ozone reactivity potential have sufficient plasticizing effect when used in conjunction with ethylchloride to achieve suitable production rates of insulating styrenic foams. Emissions of ethylchloride during foam production are considered volatile organic content ("VOC") emissions which are preferably reduced or eliminated. Therefore, styrenic foam blowing agent systems which eliminate ethylchloride are desirable.

Several disclosures of use of FC-142b in styrenic foam production have been made. Canadian Patent No. 1,086,450, issued Sep. 23, 1980, discloses production of a styrenic foam having specified characteristics which is produced using a low permeability blowing agent of a specified formula, such as FC-142b. The blowing agent is also disclosed as including a mixture of the low permeability blowing agent with at least one of fluorochloromethane, methylchloride, ethylchloride, chlorodifluoromethane, or 1,2-difluoroethane.

Suh, U.S. Pat. No. 4,636,527, issued January, 1987, discloses a process for the preparation of an alkenyl aromatic foam, such as a polystyrene foam, using a blowing agent mixture comprising about 3 to 45 wt. % carbon dioxide, about 5 to 97 wt. % ethylchloride and from about 0 to 90 wt. % of a fluorocarbon member which is dichlorodifluoromethane, 1-chloro-1,1-difluoroethane or a mixture of the two chlorofluorocarbons.

Park U.S. Pat. No. 4,528,300 discloses a process for producing a polyolefin foam employing a blowing agent comprising 50 to 95 wt. % of FC-142b plus 5 to 50 wt. % of an aliphatic hydrocarbon and/or a halogenated hydrocarbon having a boiling point from 0° to 50° C. Specifically disclosed examples of the aliphatic hydrocarbon and/or halogenated hydrocarbon are ethylchloride and butane. The method disclosed in Park also requires the presence of a stability control agent such as a stearamide in the extrusion mass comprising the polyolefin resin and the blowing agent mixture to produce a stable polyolefin foam. Park does not disclose use of his blowing agent to produce styrenic foams.

Park U.S. Pat. No. 4,640,933 also discloses a process for producing a polyolefin foam which employs a blowing agent mixture comprising, for example, isobutane plus FC-142b, or isobutane plus ethylchloride, along with the stability control agent disclosed in U.S. Pat. No. 4,528,300. Park also does not disclose use of his blowing agent to produce styrenic foams.

Dill, U.S. Pat. No. 3,640,916 discloses a mixture of butane and FC-142b for use as a propellant. Dill is not directed to the use of such a mixture as a styrenic foam blowing agent.

Nakamura, U.S. Pat. No. 3,960,792 discloses a method for producing a styrenic foam using a blowing agent mixture having a specific diffusion rate through the styrenic resin. Nakamura lists FC-142b as a possible blowing agent in his method. Nakamura also discloses that aliphatic hydrocarbons can be used in his method.

Suh, U.S. Pat. No. 4,916,166, issued Apr. 10, 1990, discloses alkenyl aromatic foam bodies produced with FC-142b as the blowing agent. The blowing agent systems disclosed therein are those having greater than 70 wt. % FC-142b. This Suh patent also discloses blends of carbon dioxide, $C_1$–$C_4$ hydrocarbons and greater than 70 wt. % FC-142b as the blowing agent system. There is no disclosure in Suh as to elimination of ethylchloride from FC-142b based blowing agents having less than 70 wt. % FC-142b.

Suh, U.S. Pat. No. 5,011,866, issued Apr. 30, 1991, discloses alkenyl aromatic foam bodies produced using at least 70 wt. % of 1,1,1-trifluoroethane (hereinafter referred to as "FC-143a") or 1,1,1,2-tetrafluoroethane (hereinafter referred to as "FC-134a") as a blowing agent. The blowing agent systems disclosed in this Suh patent also include incorporation of $C_1$–$C_4$ alkanes and carbon dioxide. Like Suh '166, this Suh patent does not disclose elimination of ethylchloride from halogenated ethane blowing agents wherein the halogenated ethane concentration is less than 70 wt. %.

Published European Patent Application 0450513A1, published Oct. 9, 1991, describes production of styrenic foams using a blowing agent and a transient foam control agent described as $C_{2-30}$ aliphatic and aromatic carboxylic acids and ester derivatives thereof, $C_{2-30}$ aliphatic and aromatic carboxylic acid amides, $C_{2-30}$ aromatic or aliphatic sulfones and amide derivatives thereof, $C_{2-30}$ aliphatic and aromatic polyhydroxy compounds, $C_{2-30}$ aliphatic and aromatic carbamate and carbamate esters, inertly substituted derivatives of these compounds and mixtures thereof. The transient foam control agent is described as useful with numerous blowing agents, including FC-142b and FC-134a. The preferred blowing agent for use with the transient foam control agent is disclosed as a mixture of $CO_2$ and FC-142b in $FC\text{-}142b/CO_2$ weight ratios from 5/95 to 50/50. The only disclosed examples tested high FC-142b concentration weight ratios of $FC\text{-}142b/CO_2$ of 12.8/1.5 and 10.9/1.5. This disclosure does not suggest use of a FC-142b, a $C_4$-$C_5$ alkane and $CO_2$ blowing agent system. Nor does it address extrusion mass viscosity control when using such a system.

It is desirable commercially to use styrenic foam blowing agent systems which minimize the amount of the hydrofluorocarbon present due to its expense. Further, it is Applicants' belief that use of amounts of the hydrofluorocarbon in excess of 70 wt. % of the total blowing agent do not achieve any additional benefit in terms of insulating value of the styrenic foams. The prior art disclosures of use of FC-142b, FC-134a and FC-143a, have focused upon use of high concentrations of these blowing agents greater than 70 wt. % or upon their use in conjunction with fluorocarbons of high ozone depletion potential, i.e. Freon-12, or ethylchloride. None of the prior art styrenic foam production disclosures have focused on the need to produce insulating styrenic foams using less than 70 wt. % of a low or zero ozone reactivity potential fluorocarbon, while eliminating ethylchloride use. None of the prior art styrenic foam processes have disclosed a blowing agent system of less than 70 wt. % of one or more of a certain group of halogenated ethanes, such as FC-142b, with a $C_4$-$C_5$ alkane and $CO_2$, combined with sufficient added plasticizing materials to achieve suitable foam production rates.

It is the general object of the invention to provide a styrenic foam blowing agent system which does not contain ethylchloride. It is an object of the invention to provide a styrenic foam blowing agent having a reduced or zero ozone reactivity potential, which comprises a halogenated ethane of low or zero ozone reactivity potential. It is yet another object to produce a dimensionally stable insulating styrenic foam having an R-value above about 5.0 using the new blowing agent. It is also an object to provide an improved insulating styrenic foam extrusion process. Other objects will be apparent from the specification.

I have found that the objects of the invention can be attained by the use of a blowing agent composition comprising: less than 70.0 wt. %, on a total blowing agent basis, of at least one halogenated ethane selected from the group consisting of 1-chloro-1,1-difluoroethane, 1,1,1,2-tetrafluoroethane, and 1,1,1-trifluoroethane, a $C_4$ or $C_5$ alkane, and $CO_2$, combined with use of sufficient added plasticizing material to achieve the melt viscosity suitable for commercial foam production rates. The method of the invention is capable of producing acceptable foams from polystyrene at suitable production rates. Other benefits of the invention will be addressed below.

SUMMARY OF THE INVENTION

Briefly, the invention provides a method for the production of styrenic foams which comprises using as a blowing agent a mixture of $CO_2$, a $C_4$ and $C_5$ alkane and less than 70.0 wt. % of at least one halogenated ethane selected from the group consisting of 1,1,1,2-tetrafluoroethane, 1-chloro-1,1-difluoroethane, and 1,1,1-trifluoroethane. Preferably, such a blowing agent mixture comprises about 60.0 to less than about 70.0 parts by weight of the halogenated ethane component, about 25.0 to about 40.0 parts by weight of isopentane, and about 0.5 to about 6.0 parts by weight $CO_2$, per 100 parts by weight of the total of all blowing agent components. The blowing agent also preferably consists essentially of the halogenated ethane, isopentane and $CO_2$. The method of the invention also comprises use of added plasticizing material in amounts sufficient to produce an extrusion mass comprising a styrenic resin, the blowing agent of the invention and the plasticizing material, which has a viscosity of about 0.6 to about 2.0 million centipoise, as measured at 130° C. and 150 reciprocal seconds shear rate. The blowing agent composition and the method employing such a composition are particularly useful in the production of insulating polystyrene foams.

The preferred embodiment of the invention is a method for producing a styrenic foam by heating in an extruder a styrenic resin and an added plasticizing material comprising a flame retardant which is liquid at ambient temperature and a lubricant wax having a freezing point in the range of about 80° to about 100° C. at ambient pressure, to produce a molten resin mixture; introducing into the molten resin mixture a blowing agent comprising at least one halogenated ethane selected from the group consisting of FC-142b, HFC-134a and HFC-143, a $C_4$ or $C_5$ alkane, and $CO_2$, wherein the halogenated ethane comprises less than about 70 wt. % of the total blowing agent, to produce a plasticized extrusion mass under a pressure sufficient to prevent foaming of the extrusion mass; and extruding the extrusion mass through a die into a zone having a temperature and pressure sufficient to permit foaming of the extrusion mass to produce the styrenic foam.

The insulating styrenic foams produced by the method of the invention are a further novel embodiment of the invention. The invention thus comprises a styrenic foam article having a minimum thickness of about one-half inch and an insulating R-value of at least about 5.0, which comprises (i) substantially closed, non-interconnecting cells containing a gas selected from the group consisting of 1-chloro-1,1-difluoroethane, 1,1,1,2-tetrafluoroethane, and 1,1,1-trifluoroethane and (ii) a plasticizing material having a freezing point at ambient temperature in the range of about 80° to about 110° C. In a preferred embodiment, the foam article also comprises a liquid flame retardant in amounts effective to achieve desired flame retardancy.

DESCRIPTION OF THE PREFERRED EMBODIMENTS

The invention comprises a method for producing an insulating styrenic foam having a thickness greater than about one-half inch, using the blowing agent composition of the invention. The novel blowing agent comprises three normally gaseous, primary components: a halogenated ethane component selected from the group consisting of at least one of 1-chloro-1,1-difluoroethane, 1,1,1,2-tetrafluoroethane and 1,1,1-trifluoroethane, a $C_4$ or $C_5$ alkane or mixtures thereof, and $CO_2$. Based on a weight percent of the total of the three gaseous components of the blowing agent, the halogenated ethane component comprises less than about 70 wt. %, preferably about 64 to about 68 wt. %, the alkane comprises about 20 to about 30 wt. % and $CO_2$ comprises about 0.5 to about 6.0 wt. %. Preferably, the alkane component is isopentane in an amount of about 24 to about 29 wt. % of the total blowing agent and the $CO_2$ is about 4 to about 5.5 wt. % of the total blowing agent. The blowing agent is preferably added in amounts of about 6 parts by weight to about 15 parts by weight blowing agent per 100 parts by weight styrenic resin.

Use of the novel blowing agent composition provides two significant advantages. First, it permits elimination of ethylchloride from an insulating foam blowing agent production process. Second, it minimizes the amount of the costly halogenated ethane component to an amount sufficient to provide long term insulating value in the produced foam.

FC-142b is the preferred halogenated ethane component in the blowing agent in the method of the invention. It is preferred over FC-143a or FC-134a because of a better insulating effect and because of a relatively better plasticizing effect.

Isopentane is preferred as the alkane component because it diffuses more slowly from a styrenic foam than other $C_4$ or $C_5$ alkanes. Because of its slower diffusivity, hydrocarbon emissions from the production site are reduced. Alkanes of carbon number lower than 4 are not useful in the method of the invention because of too high permeation rates through styrenic resins. Normal butane or isobutane, although having utility, are not preferred because they have too high a permeation rate through a styrenic foam. Alkanes of carbon number greater than 5 are not useful because they have too large of a plasticizing effect. Hexane, for example, is very close to ethylchloride in plasticizing effectiveness.

The carbon dioxide component is less than about 6.0 wt. % of the total blowing agent because amounts greater than this will result in too high a vapor pressure, thereby leading to dimensionally unstable foam. Preferably, the amount of $CO_2$ is about 4 to about 5.5 wt. % because amounts in this range provide sufficient vapor pressure, yet have a margin of safety against producing unstable foam.

In the method of the invention, use of the blowing agent of the invention is combined with use of added plasticizing material to produce an extrusion mass comprising at least one styrenic resin, the blowing agent and the added plasticizing material, having an overall system viscosity in the range of about 0.6 to about 2.0 million centipoise, measured at 130° C. and 150 reciprocal seconds shear rate. At system viscosities in this range, suitable production rates of above about 1000 lbs/hour foam can be produced using the method of the invention. In the prior art styrenic foam production processes, ethylchloride was used, particularly when using lower concentrations of a less plasticizing fluorocarbon blowing agent, such as FC-142b, because it is so effective as a plasticizer. Applicant determined that the necessary plasticization of the extrusion mass previously provided by ethylchloride in use with FC-142b, FC-143a, FC-134a or mixtures thereof, can be achieved through the addition of added plasticizing material coupled with the blowing agent of the invention.

The added plasticizing material must be effective as a plasticizer in the melt but must not affect the produced foam after it is cooled and solidified. The added plasticizing material preferably comprises a liquid flame retardant and a solid paraffinic wax. Suitable solid, lubricant paraffin wax compositions have a freezing point in the range of about 80 to about 110° C. The flame retardant plasticizing material should be a liquid flame retardant because solid flame retardants provide poor plasticizing effect. A preferred liquid flame retardant is the brominated phosphate ester available as Firemaster 836 from Great Lakes Chemical. The liquid flame retardant should have a decomposition point well above the extruder melt temperature conditions found during production of styrenic foam. Such a decomposition temperature generally must be in excess of 500° F.

The lubricant plasticizing material is a paraffinic wax, such as the montan waxes having a melting point of about 80°-110° C. Suitable montan waxes are available from Hoechst Celanese. To Applicant's knowledge, these paraffinic montan waxes have not been disclosed or used commercially in the production of polystyrenic foams. Use of such a wax and the liquid flame retardant plasticizing material to achieve desirable system viscosities is a significant attribute of the method of the invention.

The amounts of the added plasticizing material used is determined based on other system variables, such as melt temperature and pressure, extrusion rate and glass transition temperature ($T_g$) of the styrene resin, to produce overall extrusion mass viscosities within the range of 0.6 to 2.0 million centipoise. Preferably, both a liquid flame retardant and the paraffinic wax are used as the added plasticizing material. The relative amounts of the liquid flame retardant and the wax are also varied with the selection of the halogenated ethane component. Where FC-142b is used, lesser amounts of the added plasticizing material are necessary than when FC-134a is used, because FC-142b itself is a relatively better plasticizer than FC-134a. Furthermore, the relative amounts of the two added plasticizers will vary with the thickness of the styrenic foam being produced. The amount of flame retardant is generally the minimum amount to achieve desired flame retardant properties, as measured by conventional burn tests. For thicker foams, more liquid flame retardant is thus used to provide sufficient flame retardant properties. This preferably reduces the amount of added montan wax which is necessary. The amount of liquid flame retardant preferably ranges from about 0.5 to 2.5 wt. % by weight of the styrenic resin and the amount of paraffinic wax preferably ranges from about 0.25 to 1.0 wt. % by weight of the styrenic resin.

In the method of the invention a styrenic foam is produced from a "styrenic resin," which herein means a solid polymer of one or more polymerizable alkenyl aromatic compounds or a mixture of such polymers. Such an alkenyl aromatic compound has the general formula:

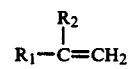

wherein $R_1$ represents an aromatic hydrocarbon radical, or an aromatic halohydrocarbon radical of the benzene or substituted benzene series, and $R_2$ is either hydrogen or the methyl radical. Examples of such alkenyl aromatic compounds are the solid homopolymer styrene, alpha-methyl styrene, orthomethyl styrene, metamethyl styrene, paramethyl styrene, the solid copolymers one or more of such alkenyl aromatic compounds with amounts of other polymerizable compounds such as a methylmethacrylate, acrylonitrile, maleic anhydride, acrylic acid and the like. A preferred styrenic resin is polystyrene which is readily available from various sources.

In the preferred method of the invention, the styrenic resin is mixed with the liquid flame retardant and paraffinic wax, the blowing agent is injected into the resin mixture, and the resulting mixture is then foamed. Preferably, the foaming is carried out with an extruder, wherein the styrenic polymer is heated to above its $T_g$ to produce a molten polymer and the blowing agent is injected into the extruder where it is mixed with the molten polymer under pressures such that the resulting plasticized extrusion mass does not foam. The extrusion mass is then extruded through a die of any desirable shape, preferably a slot die, into a confined zone of controlled temperature and pressure which permits the extrusion mass to foam to produce the styrenic foam. It is also preferred that the die size, such as height and width of a slot die, and a cooling means or apparatus, used to accept the extrusion mass as it exits the die, be precisely matched to the final desired size of the foam. The resulting foam is then cooled in any suitable manner. The method of the invention preferably uses the extrusion process conditions described in my U.S. Pat. No. 4,956,395, issued Sep. 11, 1990, herein incorporated by reference.

The temperature and pressure conditions under which the styrenic resin and blowing agent composition mixture will not foam will depend upon the exact styrenic resin used and generally will be the conditions between about 240° F. at a pressure above about 1200 psi to a temperature about 440° F. at a pressure above about 1800 psi. The conditions of temperature and pressure under which the extrusion mass will foam, again will depend upon the precise styrenic resin used and generally will be any temperature and pressure combination outside the conditions in the previous sentence. However, the more precise the temperature is controlled throughout the extrusion process, the more uniform the resulting foam. Preferably, the temperature at each stage of the extrusion process is controlled to within ±2 degrees F. of the desired temperature for each stage. The die is preferably slot shaped and has a cross sectional area of about 0.4 square inches to about 2.5 square inches, a height of about 0.015 inches to about 0.15 inches and a width of about 6.0 inches to about 30.0 inches.

In the practice of the method of the invention, the blowing agent may be added to the styrenic resin in any desirable manner and preferably by injection of a stream comprising the three primary components of the blowing agent composition in the desired ratios directly into the molten styrenic resin containing the liquid flame retardant and the montan wax in an extruder. When using the preferred tandem extruder discussed below, the blowing agent is injected into a resin at the end of the primary extruder section. The blowing agent should be mixed thoroughly with the styrenic resin before the blowing agent and styrenic resin extrusion mass is extruded through the die.

In the preparation of foams in accordance with the method of the invention, it is often desirable to add a nucleating agent to the styrenic resin. these nucleating agents serve primarily to increase cell count and reduce the cell size in the foam and are used in an amount of about one part by weight to about four parts by weight per one hundred parts resin. Improvements in the R-value of the foam can be achieved by adjusting nucleating agent content to increase cell count and reduce cell size. For example, talc, sodium bicarbonate, citric acid, calcium silicate and the like are suitable nucleating agents for reducing cell size. Talc is a preferred nucleating agent component in the practice of the method of the invention. Various other additives, for example coolants, lubricants or stabilizing additives, may also be used depending on the end use of the styrenic foam.

In a preferred tandem extruder, the primary/melting extruder screw speeds range from about 80 rpm to about 120 rpm. At such screw speeds, barrel temperatures of about 100° to about 170° F. above $T_g$ of the styrenic polymer generally are employed to heat the foamable composition to about 120° to about 150° F. above $T_g$. In the case of extrusion masses in which the polymer consists solely of polystyrene or impact polystyrene preferred for use according to this invention, the preferred barrel temperatures are about 325° F. to about 420° F. When the extrusion mass contains multiple styrenic resins heating is above the highest $T_g$ of the resins in the mass.

In the preferred tandem extruder, the secondary/cooling extruder has a screw speed of about 8 to about 12 rpm and a barrel temperature in the range of about 100° F. near the secondary extruder inlet to about 220° F. near the extrusion die.

The plasticized, foamable extrusion mass is extruded into the confined foaming zone or stage in which expansion and cooling of the extrusion mass occur. The confined zone is not restricted in the direction of travel of the expanded foamable composition and the process can be operated with continuous removal or take-off of the styrenic foam. For a given confined zone, control over foam densities is achieved by adjustment of take-off rates and extrusion rates as can be determined by persons skilled in the art by routine experimentation.

The resulting, cooled, foamed extrudate is removed from the confined zone by any suitable means. The foaming zone is preferably formed by a pair of parallel finishing plates maintained within parallel to 1.5% tolerance and at the desired temperature.

The foams can be used in their extruded form, cut into other shapes, further shaped by application of heat and pressure or otherwise machined or formed into shaped articles of desired size and shape. The styrenic foams produced by the method of the invention have particular utility for insulating material and generally will have R-values per inch above about 5. The R-value of the foams of the invention are calculated by the conventional method, and are calculated R-values of the foams after five years at ambient temperature.

Foams prepared according to the invention are substantially closed-celled products having properties comparable to commercially available insulating styrenic foams. The novel styrenic foam articles of the invention have a machine direction and a transverse direction, a thickness of at least one-half inch, a density of about 1.0 to about 3.0 lbs/cubic foot, a minimum cross-sectional area of 8 square inches, and comprise substantially closed non-interconnecting gas-containing cells containing at least one halogenated ethane selected from the group consisting of 1,1,1,2-tetrafluoroethane, 1-chloro-1-1-difluoroethane and 1,1,1-trifluoroethane and further comprising a paraffin wax having a freezing point at ambient temperature in the range of about 80° to about 110° C. The foams of the invention are preferably about one-half inch to about 3 inches in thickness. It is also preferable that the styrenic foam articles of the invention have an average cell size from about 0.1 to about 2.5 millimeters, as measured across the minimum cross-sectional dimension of the foam article. It is also preferred that the articles have a substantially uniform distribution of the cells without substantial discontinuities. The foams of the invention preferably have an absolute dimensional stability of less than 4.0 percent in any direction as measured by ASTM D2126/C578. This ASTM test method subjects the foams to elevated temperatures at high relative humidities, and then measures any changes in the foams' machine direction, transverse direction, and thickness.

It should be understood that the above description is intended to be merely illustrative and is not to be construed or interpreted as being restrictive or otherwise limiting of the present invention.

I claim:

1. A method for the production of a styrenic foam comprising:
    (a) heating a alkenyl aromatic resin and an added plasticizing material in an extruder to produce a molten resin mixture;
    (b) injecting into the molten resin mixture a blowing agent comprising at least one $C_4$–$C_5$ alkane, $CO_2$ and a halogenated ethane selected from the group consisting of 1,1,1,2-tetrafluoroethane, 1-chloro-1,1-difluoroethane, 1,1,1-trifluoroethane and mixtures thereof, wherein the halogenated ethane comprises less than about 70.0 wt. % of total blowing agent weight, to produce an extrusion mass at a temperature and under a pressure sufficient to prevent foaming of the extrusion mass;
    (c) extruding the extrusion mass through a die into a zone having a temperature and pressure sufficient to permit expansion of the extrusion mass to produce the alkenyl aromatic foam.

2. The method of claim 1 wherein the alkenyl aromatic resin is polystyrene, impact polystyrene or mixtures thereof.

3. The method of claim 1 wherein the blowing agent consists essentially of about 64.0 to about 68.0 percent by weight halogenated ethane, about 24 to about 29 percent by weight alkane and about 0.5 to about 6.0 percent by weight $CO_2$, with all percents by weight total blowing agent.

4. The method of claim 1 wherein the alkane is isopentane and the halogenated ethane is 1-chloro-1,1-difluoroethane.

5. The method of claim 1 wherein the extrusion mass has a system viscosity in the range of about 0.6 to about 2.0 million centipoise, measured at 130° C. and at 150 reciprocal seconds shear rate.

6. The method of claim 1 wherein the halogenated ethane comprises 1-chloro-1,1-difluoroethane.

7. The method of claim 1 wherein the added plasticizing material comprises a paraffin wax in an amount of about 0.5 to about 1.5 parts per 100 parts by weight styrenic resin.

8. The method of claim 1 wherein the added plasticizing material comprises a liquid flame retardant.

9. The method of claim 8 wherein the liquid flame retardant comprises a brominated phosphate ester in an amount of about 0.5 to about 2.5 parts per 100 parts by weight styrenic resin.

* * * * *